May 29, 1951 C. T. NICKELL 2,554,954
AUTOMATIC BRAKE FOR AUTOMOTIVE VEHICLES
Filed Dec. 17, 1949 2 Sheets-Sheet 1
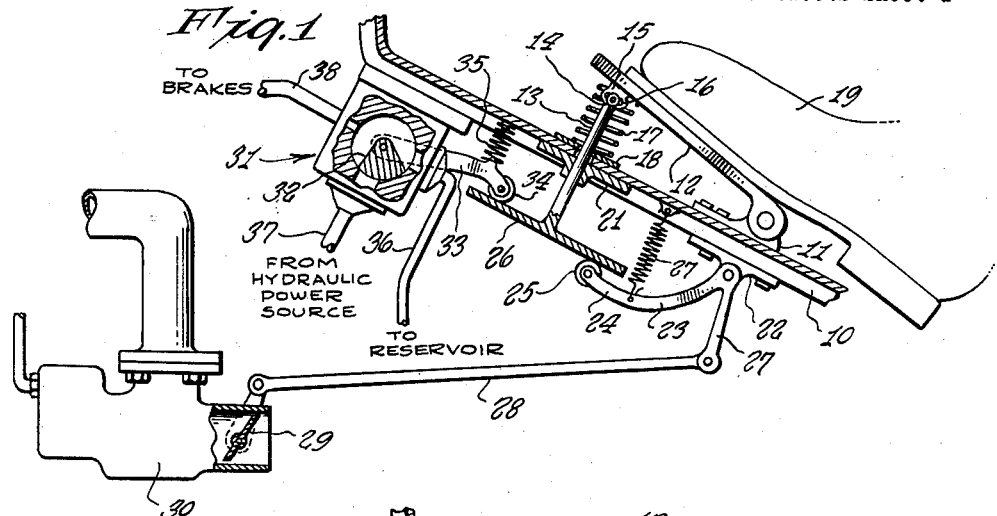
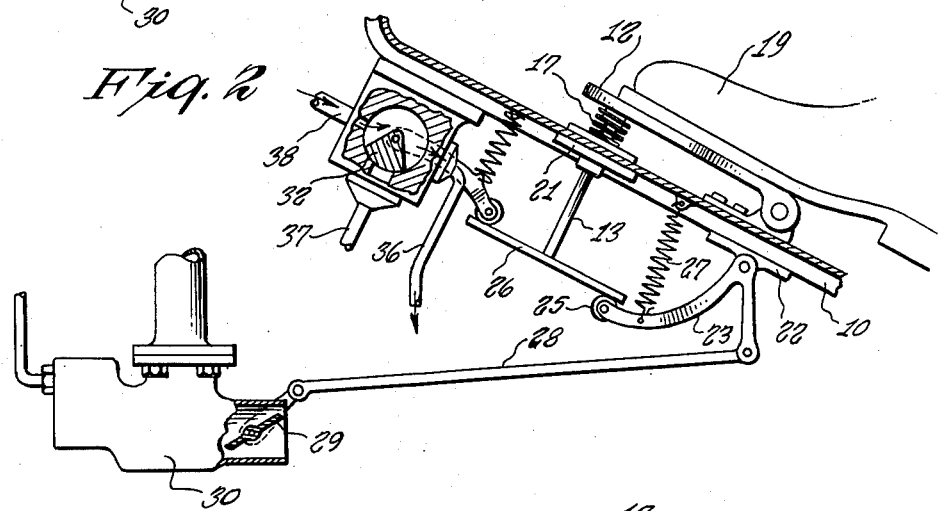
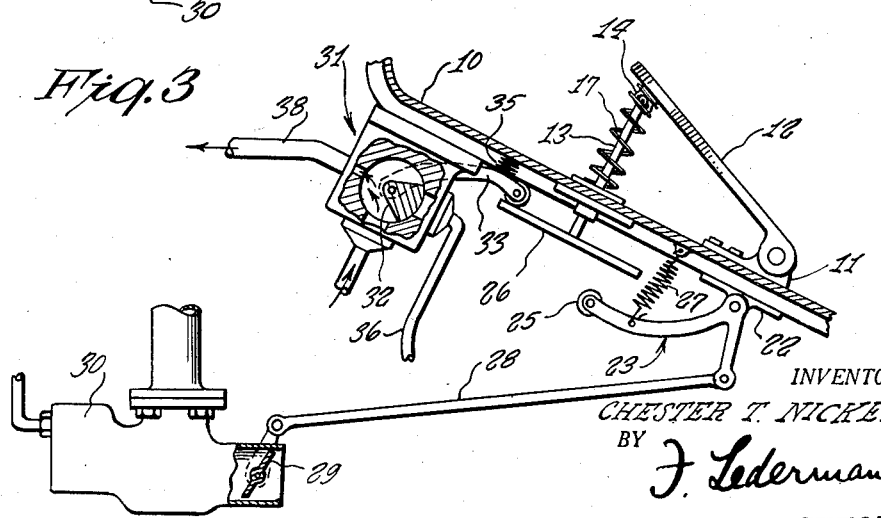
INVENTOR.
CHESTER T. NICKELL
BY
F. Ledermann
ATTORNEY

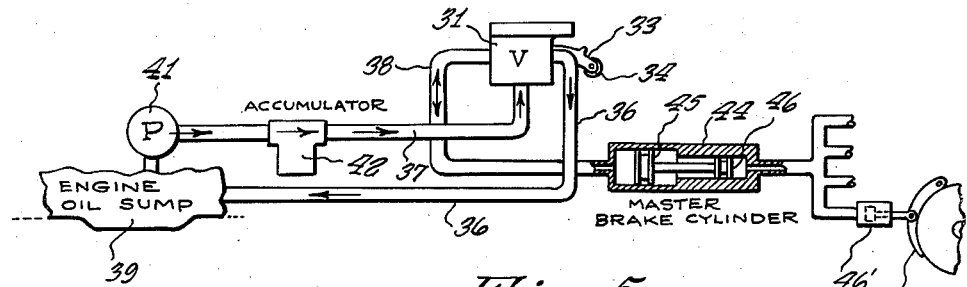
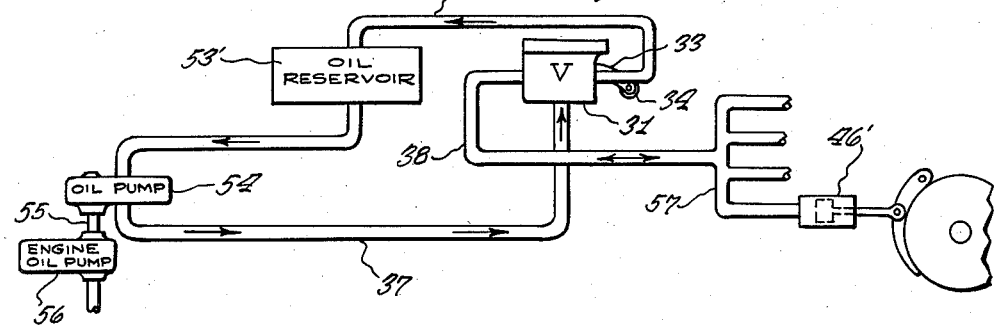
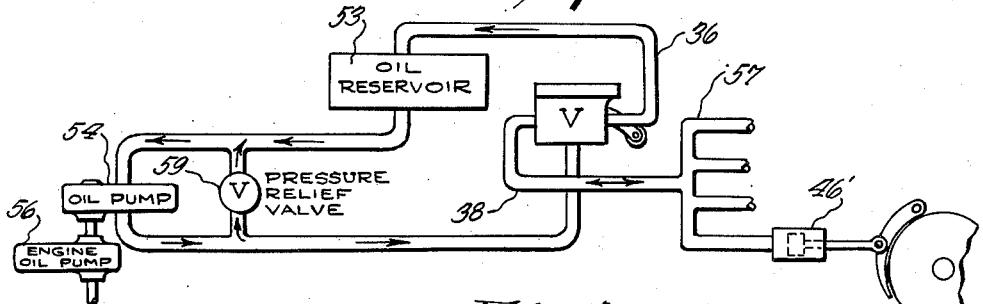
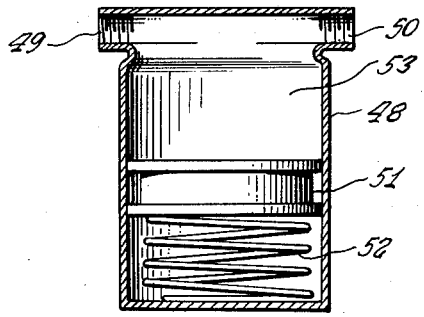
INVENTOR.
CHESTER T. NICKELL
BY J. Ledermann
ATTORNEY Patented May 29, 1951

2,554,954

UNITED STATES PATENT OFFICE 2,554,954

AUTOMATIC BRAKE FOR AUTOMOTIVE VEHICLES

Chester T. Nickell, Cherry Point, N. C.

Application December 17, 1949, Serial No. 133,610

1 Claim. (Cl. 192—3)

This invention relates to a combined accelerator and brake control for power operated vehicles.

It is an object of the present invention to provide a combined brake and accelerator control arrangement wherein automatically as the accelerator pedal is depressed, the brakes will be released and wherein upon the accelerator pedal being elevated, the hydraulic brakes will be automatically applied to stop the vehicle.

Other objects of the present invention are to provide a combined brake and accelerator arrangement which is of simple construction, inexpensive to manufacture, has a minimum number of parts, positive and automatic in operation, consumes little space, easily assembled upon the foot board structure of the vehicle, and efficient in operation.

For other objects and for a better understanding of the invention, reference may be had to the following detailed description taken in connection with the accompanying drawing, in which Fig. 1 is a sectional view of the arrangement with the foot upon the accelerator and slightly depressing the same.

Fig. 2 is a sectional view of the arrangement with the foot fully depressing the pedal whereby the valve of the carburetor is open and the hydraulic power source cut off to permit the return of the fluid from the brake actuators to the reservoir.

Fig. 3 is a sectional view of the arrangement with the accelerator pedal fully released and fluid passing from the power source to the brake actuators.

Fig. 4 is a diagrammatic view of one form of system wherein the oil is taken from the oil sump of the engine and wherein there is provided an accumulator and a master brake cylinder.

Fig. 5 is a diagrammatic view of a different hydraulic system wherein a separate oil reservoir is provided and the master brake cylinder is not used.

Fig. 6 is a diagrammatic view of a still further form of the hydraulic system, similar to the system shown in Fig. 5 and utilizing a pressure relief or bypass valve.

Fig. 7 is an enlarged vertical sectional view of the accumulator used in the system shown in Fig. 4.

Referring now to the figures, 10 represents a floor board structure on which is a bracket 11 pivotally supporting an accelerator pedal 12. To the upper end of the accelerator pedal 12 there is pivotally connected a plunger shaft 13. The pivotal connection is indicated at 14 and is made through a depending bracket portion 15 of the pedal 12 which has an elongated slot 16 that will allow the pivot pin 14 to be adjusted so that it can be accommodated and permit the shaft 13 to be operated without binding as the pedal 12 is pivoted. A coil spring 17 surrounds the shaft 13 and reacts between a washer 18 on the floor board structure and the under side of the pedal 12 and tends to keep the pedal 12 elevated upon release of foot 19 therefrom. A wear plate 21 is provided on the under side of the floor structure through which the shaft 13 is adjusted and by means of which it is guided.

On the under side of tthe floor structure 10 is a bearing bracket 22 which has a bell crank 23 pivotally connected to it. Arm 24 of the bell crank has a roller 25 engaging with under face of a plate formation 26 on the shaft 13. A spring 27 maintains the roller 25 against the plate formation 26. This tension spring is connected between the arm 24 and the floor structure 10.

An arm 27 of bell crank 23 connects through a long link 28 with a butterfly valve 29 of an engine carburetor 30. As the accelerator 12 is depressed in the manner as shown in Figs. 1 and 2, the butterfly valve 29 is moved to the open position so as to permit the flow of fuel mixture to the vehicle engine.

Above the plate formation 26 and depending from the floor board structure 10 is a hydraulic valve 31 that has an operating element 32. This operating element is connected to an operating arm 33 having a roller 34 bearing against the upper face of the plate formation 26. A pressure spring 35 keeps the roller 34 upon the plate formation 26. This valve 31 has a supply pipe 36, an input pipe 37 from a hydraulic pump or power source and a brake pipe 38, Figs. 1, 2 and 3.

In Fig. 4 there is shown one hydraulic system in which the present valve 31 is employed. A power source is the engine oil sump 39. Oil is lifted out of this sump 39 by a pump 41 and a constant pressure is maintained in the supply pipe 37 by an accumulator 42. Oil is returned to the oil sump through pipe 36. The pipe 38 is connected to a master brake cylinder 44 having a main or large piston 45 and a small piston 46 which forces the oil under high pressure to brake actuating cylinders 46' connected to brake arms 47. The accumulator comprises a casing 48, Fig. 7, which has an inlet opening 49 and an outlet opening 50. A piston 51 is supported on a spring 52 and this spring through the piston maintains a constant pressure of oil passing into chamber 53 lying above the piston 51.

In Fig. 5 there is shown a modified system wherein an oil reservoir 53' independent of the engine is used. An oil pump 54 is driven by engine oil pump shaft 55 on which is the engine oil pump 56 and this pump delivers fluid under pressure to pipe 37 and the fluid enters the valve 31. This fluid leaves the valve 31 through the pipe 38 which leads directly to a manifold 57 to which brake cylinders 46 are connected. The accumulator and the master brake cylinder are dispensed with in this system.

In Fig. 6, a system similar to that shown and described in Fig. 5, is used, but in addition thereto there is provided a pressure relief or bypass valve 59.

In operation, as the foot 19 depresses the pedal 12, as shown in Fig. 1, valve element 32 is moved under the action of spring 35 to a position to close off hydraulic power source pipe 37 whereby to release the brakes to permit the return flow of fluid from the brakes to the reservoir and simultaneously the butterfly valve 29 of the carburetor 30 is actuated to allow more air to the carburetor and to increase the speed of the engine. As the foot 19 is released, the accelerator pedal 12 will be elevated under the action of spring 17 whereby to shut off the flow of air past the butterfly valve 29 and to cause the valve element 32 to be adjusted to the position shown in Fig. 3 whereby fluid under pressure will automatically be delivered to the brake cylinders to automatically apply the brakes of the vehicle.

It will be apparent that this is a simple arrangement and that by means of a single plate formation 26 having the shaft 13 that both the carburetor and the hydraulic valve can be operated, the roller 25 of the bell crank 23 being operated by the under face of the plate portion 26 while the roller 34 engages with the upper face of the plate portion 26.

While various changes may be made in the detail construction, it shall be understood that such changes shall be within the spirit and scope of the present invention as defined by the appended claim.

I claim:

A combined accelerator and brake operating arrangement for motor vehicles comprising a floor board structure, an accelerating pedal pivotally connected to the floor board structure, a plunger shaft slidable through the floor board structure and connected to the accelerator pedal to be operated by the same, a plunger plate formation on the lower end of the shaft, a bell crank adapted to be connected to the butterfly valve of a carburetor engaging with one side of the plunger plate formation, tension spring means maintaining said bell crank arm against the face of the plunger plate, a valve device for hydraulic brakes having an operating arm, and spring means maintaining said operating arm against the upper side of the plunger plate formation whereby as the accelerator pedal is depressed, the carburetor valve will be operated and automatically the brake valve will be operated to prevent the flow of fluid under pressure to the brake cylinders, said pedal having a bracket on the underside thereof, said plunger shaft having a pin on the upper end thereof substantially at right angles thereto, said bracket having a slot therein, said pin registering in said slot, and a wear and guide plate connected to the foot board structure and slidably receiving the plunger shaft, spring means extending between the floor board structure and the accelerator pedal and surrounding said plunger shaft, said bell crank lying below the plunger plate and having a roller for the engagement with the under side of the same, said brake valve having an operating arm and roller thereon and said roller engaging with the upper face of the plunger plate, and pressure spring means reacting between the floor board structure and the operating arm of the brake valve.

CHESTER T. NICKELL.

REFERENCES CITED

The following references are of record in the file of this patent:

UNITED STATES PATENTS

| Number | Name | Date |
|---|---|---|
| 1,919,930 | Cash | July 25, 1933 |
| 2,162,183 | Smith | June 13, 1939 |
| 2,188,234 | Schwenn | Jan. 23, 1940 |
| 2,196,125 | Smith | Apr. 2, 1940 |
| 2,196,346 | Vau | Apr. 9, 1940 |